(12) United States Patent
Otis et al.

(10) Patent No.: US 8,170,892 B1
(45) Date of Patent: May 1, 2012

(54) SYSTEM AND METHOD FOR ESTABLISHING RATES FOR AN AUTOMOBILE INSURANCE POLICY

(75) Inventors: Robert Otis, San Antonio, TX (US); Deborah Murphy, San Antonio, TX (US); Michael A. Merwath, San Antonio, TX (US); Thomas F. Damrow, San Antonio, TX (US); Karen D. Meloni, San Antonio, TX (US); Denise Stockland, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 1903 days.

(21) Appl. No.: 10/457,114

(22) Filed: Jun. 9, 2003

Related U.S. Application Data

(60) Provisional application No. 60/387,623, filed on Jun. 11, 2002.

(51) Int. Cl.
*G06Q 40/00* (2012.01)
(52) U.S. Cl. .................... 705/4; 705/3; 705/38
(58) Field of Classification Search ............... 705/4, 38
See application file for complete search history.

(56) References Cited

U.S. PATENT DOCUMENTS

| | | | | |
|---|---|---|---|---|
| 4,831,526 A | * | 5/1989 | Luchs et al. | 705/4 |
| 5,797,134 A | | 8/1998 | McMillan et al. | |
| 5,809,478 A | * | 9/1998 | Greco et al. | 705/4 |
| 6,064,970 A | | 5/2000 | McMillan et al. | |
| 7,379,913 B2 | * | 5/2008 | Steele et al. | 705/38 |
| 7,398,218 B1 | * | 7/2008 | Bernaski et al. | 705/3 |
| 2002/0087364 A1 | * | 7/2002 | Lerner et al. | 705/4 |
| 2002/0138310 A1 | * | 9/2002 | Sagalow | 705/4 |
| 2003/0093302 A1 | * | 5/2003 | Quido et al. | 705/4 |

OTHER PUBLICATIONS

EIC search results, Sep. 14, 2010.*
Google patents search results, Dec. 17, 2011.*
Google scholar search results, Dec. 17, 2011.*

* cited by examiner

*Primary Examiner* — Dilek B Cobanoglu
(74) *Attorney, Agent, or Firm* — Schwegman, Lundberg & Woessner, P.A.

(57) ABSTRACT

Automobile insurance rates are established by performing calculations for defining a single tier placement dependent upon a combination of mutually exclusive factors based on applicant data. The factors include a household driving record gradient, a stability gradient and an operator driving record gradient. In the case of a new policy, the factors also include a named insured driving experience gradient and a prior insurance gradient. Alternately, in the case of a renewal policy, the factors also include a household claims record gradient, a member relationship gradient and an operator claims record gradient. No single factor is the sole determinant for placement in a tier.

27 Claims, 12 Drawing Sheets

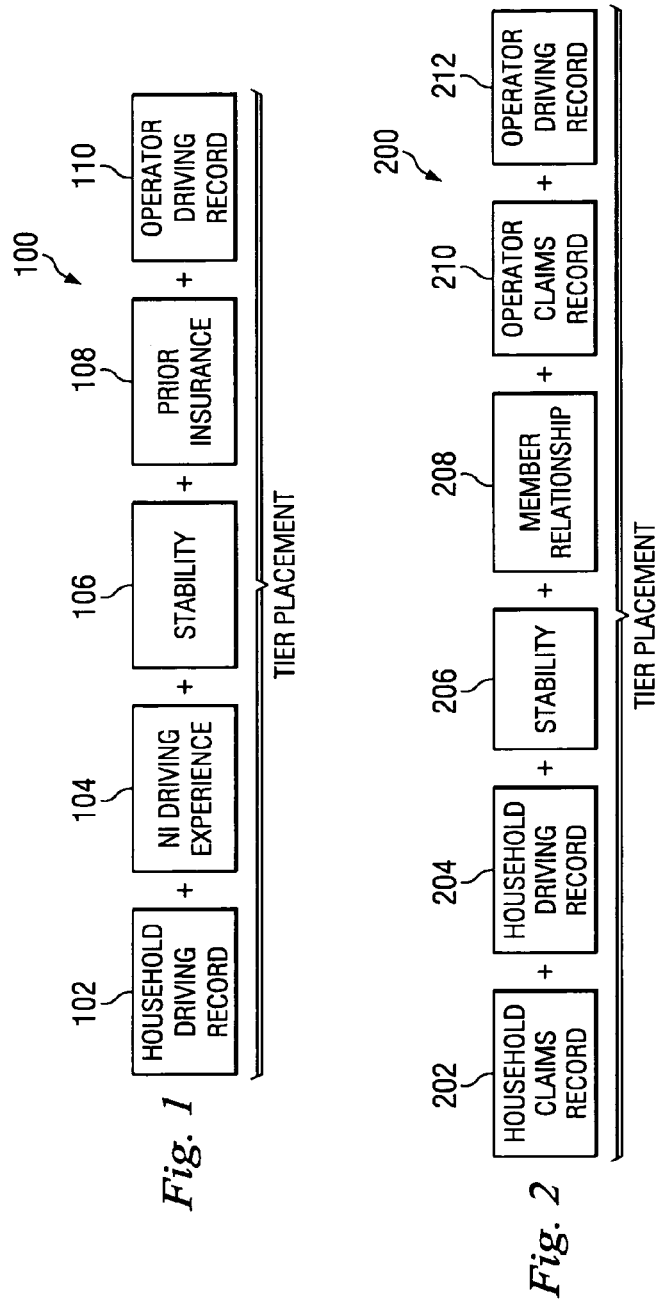

-Threshold Definitions- 102

| Underwriting Component | Gradient | Threshold Definition | |
|---|---|---|---|
| HOUSEHOLD DRIVING RECORD<br>• Single-Vehicle Household<br>• Incidents within the last 3 years | Clean | 0 Major, 0 Minor, 0 At-Fault, 0 Not-At-Fault, Active License, No FR Reqd | |
| | Good | 0 Major, 1 Minor, 0 At-Fault, 0 Not-At-Fault, Active License, No FR Reqd | OR |
| | 102a | 0 Major, 0 Minor, 0 At-Fault, 1 Not-At-Fault, Active License, No FR Reqd | OR |
| | | 0 Major, 1 Minor, 0 At-Fault, 1 Not-At-Fault, Active License, No FR Reqd | |
| | Marginal | 0 Major, 0-1 Minor, 1 At-Fault, 0-1 Not-At-Fault, Active License, No FR Reqd | OR |
| | | 0 Major, 2 Minors, 0 At-Fault, 0-1 Not-At-Fault, Active License, No FR Reqd | OR |
| | | 0 Major, 0-1 Minor, 0 At-Fault, 2 Not-At-Fault, Active License, No FR Reqd | |
| | Poor | Financial Responsibility Required (Excluding Unacceptable Household Gradients) | OR |
| | | Nonverifiable MVR (Excluding Unacceptable Household Gradients) | OR |
| | | 0 Majors, 2 Minors, 1 At-Faults, 0-1 Not-At-Faults, Active License, No FR Reqd | OR |
| | | 0 Majors, 3+ Minors, 0-2 At-Faults, 0-1 Not-At-Faults, Active License, No FR Reqd | OR |
| | | 0 Majors, 0-2 Minors, 2 At-Faults, 0-1 Not-At-Faults, Active License, No FR Reqd | OR |
| | | 0 Majors, 0-1 Minor, 1 At-Fault, 2 Not-At-Faults, Active License, No FR Reqd | OR |
| | | 0 Majors, 2-4 Minors, 0-1 At-Fault, 2 Not-At-Faults, Active License, No FR Reqd | OR |
| | | 0 Majors, 5+ Minors, 0-1 At-Faults, 2 Not-At-Faults, Active License, No FR Reqd | OR |
| | | 0 Majors, 0+ Minors, 2 At-Faults, 2 Not-At-Faults, Active License, No FR Reqd | OR |
| | | 0 Majors, 0+ Minors, 0-2 At-Fault, 3-5 Not-At-Faults, Active License, No FR Reqd | OR |
| | | 1 Major, 0-1 Minors, 0-1 At-Fault, 0-2 Not-At-Faults, Active License, No FR Reqd | OR |
| | | 1 Major, 2+ Minors, 0 At-Faults, 0-2 Not-At-Faults, Active License, No FR Reqd | |
| | Unacceptable | 3+ At-Faults, Active License | OR |
| | | 1 Major, 2+ Minors, 1-2 At-Fault, 0-2 Not-At-Faults, Active License | OR |
| | | 1 Major, 0-1 Minors, 2+ At-Faults, 0-2 Not-At-Faults, Active License | OR |
| | | 1 Major, 3+ Not-At-Faults, Active License | OR |
| | | 2+ Majors, Active License | OR |
| | | 6+ Not-At-Faults, Active License | OR |
| | | Suspended/Revoked/Not Licensed | |

| CREDIT RANGE* | NUMBER NPC's** | ELIGIBILITY | VEHICLE COUNT | STABILITY |
|---|---|---|---|---|
| RANGE 1 | 0 | USAA, CIC, NCO | N/A | EXCELLENT |
| RANGE 1 | 0 | ENL | N/A | GOOD |
| RANGE 1 | 1 | USAA, CIC, NCO | N/A | GOOD |
| RANGE 1 | 1 | ENL | N/A | AVERAGE |
| RANGE 1 | 2+ | N/A | N/A | ACCEPTABLE |
|  |  |  |  |  |
| RANGE 2 | 0 | USAA, CIC | N/A | EXCELLENT |
| RANGE 2 | 0 | NCO | N/A | GOOD |
| RANGE 2 | 0 | ENL | MULTI | GOOD |
| RANGE 2 | 0 | ENL | SINGLE | FAIR |
| RANGE 2 | 1 | USAA, CIC | N/A | GOOD |
| RANGE 2 | 1 | NCO | N/A | AVERAGE |
| RANGE 2 | 1 | ENL | MULTI | AVERAGE |
| RANGE 2 | 1 | ENL | SINGLE | ACCEPTABLE |
| RANGE 2 | 2+ | N/A | N/A | ACCEPTABLE |
|  |  |  |  |  |
| RANGE 3 | 0 | USAA | N/A | GOOD |
| RANGE 3 | 0 | CIC, NCO, ENL | MULTI | GOOD |
| RANGE 3 | 0 | CIC | SINGLE | AVERAGE |
| RANGE 3 | 0 | NCO, ENL | SINGLE | FAIR |
| RANGE 3 | 1 | USAA | N/A | AVERAGE |
| RANGE 3 | 1 | CIC, NCO, ENL | MULTI | AVERAGE |
| RANGE 3 | 1 | CIC | SINGLE | FAIR |
| RANGE 3 | 1 | NCO, ENL | SINGLE | ACCEPTABLE |
| RANGE 3 | 2+ | N/A | N/A | ACCEPTABLE |

Fig. 6

—Threshold Definitions—
108

| Underwriting Component | Gradient | Threshold Definition | |
|---|---|---|---|
| PRIOR INSURANCE | Good | Prior Standard/Preferred/USAA/CIC/LTD/USCM/Unknown, Lapsed <=7 days | OR |
| | | Prior Nonstandard, Lapsed <=7 days | OR |
| | | Prior Assigned Risk, No Lapse | |
| | Marginal | Prior Standard/Preferred/USAA/CIC/LTD/USCM/Unknown, Lapsed 8-30 days | OR |
| | | Prior Nonstandard, Lapsed 8-30 days | OR |
| | Poor | No Prior | OR |
| | | Prior Standard/Preferred/USAA/CIC/LTD/USCM/Unknown, Lapsed > 30 days | OR |
| | | Prior Nonstandard, Lapsed > 30 days | OR |
| | | Prior Assigned Risk, Lapsed > 0 days | |

HOUSEHOLD DRIVING RECORD
1 VEHICLE *
204

| NUMBER | GRADIENTS* | NUMBER MAJORS (PAST 3 YEARS) | NUMBER MINORS (PAST 3 YEARS) | ACTIVE FINANCIAL RESPONSIBILITY FILING** |
|---|---|---|---|---|
| 1 | CLEAN | 0 | 0 | NO |
| 2 | GOOD | 0 | 1-2 | NO |
| 3 | MARGINAL | 0 | 3-4 | NO |
| 4 | POOR | 0 | 5+ | NO |
| 5 | POOR | 1 | 0-3 | NO |
| 6 | POOR | 0 | 0+ | YES |
| 7 | POOR | 1 | 0-3 | YES |
| 8 | UNACCEPTABLE | 1 | 4+ | N/A |
| 9 | UNACCEPTABLE | 2+ | 0+ | N/A |

204a

Threshold Definitions

| Underwriting Component | Gradient | Threshold Definition | |
|---|---|---|---|
| OPERATOR DRIVING RECORD<br>• Incidents within the last 3 years | Good | 0 Major, 0-1 Minor, 0 At-Faults, 0-1 Not-At-Faults, Active License, No FR Reqd | OR |
| | Marginal | 0 Major, 0-1 Minor, 1 At-Fault, 0-1 Not-At-Fault, Active License, No FR Reqd | OR |
| | | 0 Major, 2 Minor, 0 At-Faults, 0-1 Not-At-Faults, Active License, No FR Reqd | OR |
| | | 0 Major, 0-1 Minor, 0 At-Faults, 2 Not-At-Faults, Active License, No FR Reqd | OR |
| | Poor | Financial Responsibility Required (Excluding Unacceptable Individual Gradients) | OR |
| | | Nonverifiable MVR (Excluding Unacceptable Individual Gradients) | OR |
| | | 0 Majors, 2 Minors, 1 At-Faults, 0-1 Not-At-Faults, Active License, No FR Reqd | OR |
| | | 0 Majors, 3+ Minors, 0-2 At-Faults, 0-1 Not-At-Faults, Active License, No FR Reqd | OR |
| | | 0 Majors, 0-2 Minors, 2 At-Faults, 0-1 Not-At-Faults, Active License, No FR Reqd | OR |
| | | 0 Majors, 0-1 Minor, 1 At-Fault, 2 Not-At-Faults, Active License, No FR Reqd | OR |
| | | 0 Majors, 2-4 Minors, 0-1 At-Faults, 2 Not-At-Faults, Active License, No FR Reqd | OR |
| | | 0 Majors, 5+ Minors, 0-1 At-Faults, 2 Not-At-Faults, Active License, No FR Reqd | OR |
| | | 0 Majors, 0+ Minors, 2 At-Faults, 2 Not-At-Faults, Active License, No FR Reqd | OR |
| | | 0 Majors, 0+ Minors, 0-2 At-Fault, 3-5 Not-At-Faults, Active License, No FR Reqd | OR |
| | | 1 Major, 0-1 Minors, 0-1 At-Fault, 0-2 Not-At-Faults, Active License, No FR Reqd | OR |
| | | 1 Major, 2+ Minors, 0 At-Faults, 0-2 Not-At-Faults, Active License, No FR Reqd | OR |
| | Unacceptable | 3+ At-Faults, Active License | OR |
| | | 1 Major, 2+ Minors, 1-2 At-Fault, 0-2 Not-At-Faults, Active License | OR |
| | | 1 Major, 0-1 Minors, 2+ At-Faults, 0-2 Not-At-Faults, Active License | OR |
| | | 1 Major, 3+ Not-At-Faults, Active License | OR |
| | | 2+ Major, Active License | OR |
| | | 6+ Not-At-Faults, Active License | OR |
| | | Suspended/Revoked/Not Licensed | |

| PROFILE NUMBER | HOUSEHOLD DRIVING RECORD | NI DRIVING EXP | STABILITY | PRIOR INS | ANY/ALL | OPERATOR DRIVING RECORD | OUTCOME | TIER |
|---|---|---|---|---|---|---|---|---|
| 1017 | GOOD | EXP | AVERAGE | MARG-POOR | ALL | GOOD OR [MARG, EXP, EARLY ADULT OR ADULT] | STANDARD | 3B |
| 1018 | GOOD | EXP | FAIR | GOOD | ALL | GOOD OR [MARG, EXP, EARLY ADULT OR ADULT] | STANDARD | 3B |
| 1019 | POOR | EXP | EXC-GOOD | GOOD | ALL | GOOD INDIVIDUAL DRIVING REC | STANDARD | 3B |
| 1020 | CLEAN | EXP | ACCEPTABLE | N/A | N/A | N/A | NONSTANDARD | 4A |
| 1042 | GOOD | INEXP | EXCELLENT | GOOD | ANY | MARG AND [VERY YOUNG, YOUNG, MATURE, OR INEXP] | NONSTANDARD | 4A |
| 1043 | GOOD | INEXP | EXCELLENT | MARG-POOR | N/A | N/A | NONSTANDARD | 4A |
| 1021 | CLEAN | INEXP | AVERAGE | MARG-POOR | N/A | N/A | NONSTANDARD | 4A |
| 1022 | CLEAN | INEXP | FAIR-ACCEPT | N/A | N/A | N/A | NONSTANDARD | 4A |
| 1024 | GOOD | EXP | EXC-AVG | N/A | ANY | MARG AND [VERY YOUNG, YOUNG, MATURE, OR INEXP] | NONSTANDARD | 4A |
| 1025 | GOOD | EXP | FAIR | GOOD | ANY | MARG AND [VERY YOUNG, YOUNG, MATURE, OR INEXP] | NONSTANDARD | 4A |
| 1026 | GOOD | EXP | FAIR | MARG-POOR | ALL | GOOD, MARG | NONSTANDARD | 4A |
| 1027 | GOOD | EXP | ACCEPTABLE | N/A | ALL | GOOD, MARG | NONSTANDARD | 4A |
| 1028 | GOOD | EXP | N/A | N/A | ANY | POOR | NONSTANDARD | 4A |
| 1029 | GOOD | INEXP | GOOD-ACCEPTABLE | N/A | N/A | N/A | NONSTANDARD | 4A |
| 1030 | MARGINAL | EXP | EXC-GOOD | GOOD | ANY | MARG AND [VERY YOUNG, YOUNG, MATURE, OR INEXP] | NONSTANDARD | 4A |
| 1031 | MARGINAL | EXP | EXC-GOOD | GOOD | ANY | POOR | NONSTANDARD | 4A |
| 1032 | MARGINAL | EXP | AVG, FAIR, ACCEPT | GOOD | N/A | N/A | NONSTANDARD | 4A |
| 1033 | MARGINAL | EXP | N/A | MARG-POOR | N/A | N/A | NONSTANDARD | 4A |
| 1034 | MARGINAL | INEXP | N/A | N/A | N/A | N/A | NONSTANDARD | 4A |

202

HOUSEHOLD CLAIMS RECORD
1 VEHICLE *

| NUMBER | GRADIENT | NUMBER AT-FAULT BI, PD, CO (PAST 3 YEARS)** | NUMBER OTHER LOSSES (PAST 3 YEARS)** | NUMBER AT-FAULT BI, PD, CO (YEARS 4 AND 5)**** |
|---|---|---|---|---|
| 1 | CLEAN | 0 | 0 | N/A |
| 2 | GOOD | 0 | 1-3 | N/A |
| 3 | FAIR | 0 | 4+ | N/A |
| 4 | FAIR | 1 | 0 | 0+ |
| 5 | FAIR | 1 | 1 | 0 |
| 6 | MARGINAL | 1 | 1 | 1+ |
| 7 | MARGINAL | 1 | 2 | 0 |
| 8 | MARGINAL | 2 | 0 | 0 |
| 9 | POOR | 1 | 2 | 1+ |
| 10 | POOR | 1 | 3+ | 0+ |
| 11 | POOR | 2 | 0 | 1+ |
| 12 | POOR | 2 | 1+ | 0+ |
| 13 | POOR | 3 | 0-3 | 0-2 |
| 14 | POOR | 4 | 0-2 | 0-1 |
| 15 | POOR | 5 | 0-1 | 0-1 |
| 16 | POOR | 6 | 0 | 0 |
| 17 | UNACCEPTABLE | 3 | 0-3 | 3+ |
| 18 | UNACCEPTABLE | 3 | 4+ | 0+ |
| 19 | UNACCEPTABLE | 4 | 0-2 | 2+ |
| 20 | UNACCEPTABLE | 4 | 3+ | 0+ |
| 21 | UNACCEPTABLE | 5 | 0-1 | 2+ |
| 22 | UNACCEPTABLE | 5 | 2+ | 0+ |
| 23 | UNACCEPTABLE | 6 | 0 | 1+ |
| 24 | UNACCEPTABLE | 6 | 1+ | 0+ |
| 25 | UNACCEPTABLE | 7+ | 0+ | 0+ |

202a → (row 5)

*Fig. 9*

RENEWAL STABILITY    Fig. 11

| AUTO TENURE* | CREDIT SCORE** | NPCs*** | ELIGIBILITY CLASS**** | VEHICLE COUNT | STABILITY |
|---|---|---|---|---|---|
| 19+ MONTHS | N/A | 0 | N/A | N/A | EXCELLENT |
| 19+ MONTHS | N/A | 1 | USAA, CIC, NCO | N/A | GOOD |
| 19+ MONTHS | N/A | 1 | ENL | N/A | AVERAGE |
| 19+ MONTHS | N/A | 2+ | N/A | N/A | ACCEPTABLE |
| 0-18 MONTHS | RANGE 1 | 0 | USAA, CIC, NCO | N/A | EXCELLENT |
| 0-18 MONTHS | RANGE 1 | 0 | ENL | N/A | GOOD |
| 0-18 MONTHS | RANGE 1 | 1 | USAA, CIC, NCO | N/A | GOOD |
| 0-18 MONTHS | RANGE 1 | 1 | ENL | N/A | AVERAGE |
| 0-18 MONTHS | RANGE 1 | 2+ | N/A | N/A | ACCEPTABLE |
| 0-18 MONTHS | RANGE 2 | 0 | USAA, CIC | N/A | EXCELLENT |
| 0-18 MONTHS | RANGE 2 | 0 | NCO | N/A | GOOD |
| 0-18 MONTHS | RANGE 2 | 0 | ENL | MULTI | GOOD |
| 0-18 MONTHS | RANGE 2 | 0 | ENL | SINGLE | FAIR |
| 0-18 MONTHS | RANGE 2 | 1 | USAA, CIC | N/A | GOOD |
| 0-18 MONTHS | RANGE 2 | 1 | NCO | N/A | AVERAGE |
| 0-18 MONTHS | RANGE 2 | 1 | ENL | MULTI | AVERAGE |
| 0-18 MONTHS | RANGE 2 | 1 | ENL | SINGLE | ACCEPTABLE |
| 0-18 MONTHS | RANGE 2 | 2+ | N/A | N/A | ACCEPTABLE |
| 0-18 MONTHS | RANGE 3 | 0 | USAA | N/A | GOOD |
| 0-18 MONTHS | RANGE 3 | 0 | CIC, NCO, ENL | MULTI | GOOD |
| 0-18 MONTHS | RANGE 3 | 0 | CIC | SINGLE | AVERAGE |
| 0-18 MONTHS | RANGE 3 | 0 | NCO, ENL | SINGLE | FAIR |
| 0-18 MONTHS | RANGE 3 | 1 | USAA | N/A | AVERAGE |
| 0-18 MONTHS | RANGE 3 | 1 | CIC, NCO, ENL | MULTI | AVERAGE |
| 0-18 MONTHS | RANGE 3 | 1 | CIC | SINGLE | FAIR |
| 0-18 MONTHS | RANGE 3 | 1 | NCO, ENL | SINGLE | ACCEPTABLE |
| 0-18 MONTHS | RANGE 3 | 2+ | N/A | N/A | ACCEPTABLE |
| 0-18 MONTHS | RANGE 4 | 0 | USAA, CIC | MULTI | GOOD |
| 0-18 MONTHS | RANGE 4 | 0 | USAA | SINGLE | AVERAGE |
| 0-18 MONTHS | RANGE 4 | 0 | CIC | SINGLE | FAIR |
| 0-18 MONTHS | RANGE 4 | 0 | NCO, ENL | N/A | FAIR |
| 0-18 MONTHS | RANGE 4 | 1 | USAA, CIC | MULTI | AVERAGE |

208

MEMBER RELATIONSHIP

| NUMBER | GRADIENTS | MEMBER TENURE* | COLLATERAL COVERAGES** |
|---|---|---|---|
| 1 | EXCELLENT | 20+ YEARS | N/A |
| 2 | EXCELLENT | 6-19 YEARS | YES |
| 3 | GOOD | 6-19 YEARS | NO |
| 4 | GOOD | 0-5 YEARS | YES |
| 5 | AVERAGE | 0-5 YEARS | NO |

208a points to row 2

* MEMBER TENURE IS CALCULATED BY SUBTRACTING THE MEMBER'S CORPORATE FIRST ACTIVITY DATE FROM THE RENEWAL EFFECTIVE DATE

** COLLATERAL COVERAGE IS YES IF THE MEMBER HAS AN ACTIVE HOMEOWNER, CONDO, OR RENTER POLICY AT THE TIME OF RISK ASSESSMENT

OPERATOR DRIVING RECORD

| NUMBER | GRADIENTS | NUMBER MAJORS (PAST 3 YEARS) | NUMBER MINORS (PAST 3 YEARS) | ACTIVE FINANCIAL RESPONSIBILITY FILING* |
|---|---|---|---|---|
| 1 | CLEAN | 0 | 0 | NO |
| 2 | GOOD | 0 | 1-2 | NO |
| 3 | MARGINAL | 0 | 3-4 | NO |
| 4 | POOR | 0 | 5+ | NO |
| 5 | POOR | 1 | 0-3 | NO |
| 6 | POOR | 0 | 0+ | YES |
| 7 | POOR | 1 | 0-3 | YES |
| 8 | UNACCEPTABLE | 1 | 4+ | N/A |
| 9 | UNACCEPTABLE | 2+ | 0+ | N/A |

*Fig. 14*

OPERATOR CLAIMS RECORD

| NUMBER | GRADIENT | NUMBER AT-FAULT BI, PD, CO (PAST 3 YEARS)* | NUMBER OTHER LOSSES (PAST 3 YEARS) | NUMBER AT-FAULT BI, PD, CO (YEARS 4 AND 5)* |
|---|---|---|---|---|
| 1 | CLEAN | 0 | 0 | N/A |
| 2 | GOOD | 0 | 1-2 | N/A |
| 3 | FAIR | 0 | 3-4 | N/A |
| 4 | FAIR | 1 | 0 | 0-1 |
| 5 | FAIR | 1 | 1 | 0 |
| 6 | MARGINAL | 0 | 5+ | N/A |
| 7 | MARGINAL | 1 | 0 | 2+ |
| 8 | MARGINAL | 1 | 1 | 1 |
| 9 | MARGINAL | 1 | 2 | 0 |
| 10 | MARGINAL | 2 | 0 | 0 |
| 11 | POOR | 1 | 1 | 2+ |
| 12 | POOR | 1 | 2 | 1+ |
| 13 | POOR | 1 | 3+ | 0+ |
| 14 | POOR | 2 | 0 | 1+ |
| 15 | POOR | 2 | 1+ | 0+ |
| 16 | POOR | 3 | 0-3 | 0-2 |
| 17 | POOR | 4 | 0-2 | 0-1 |
| 18 | POOR | 5 | 0-1 | 0-1 |
| 19 | POOR | 6 | 0 | 0 |
| 20 | UNACCEPTABLE | 3 | 0-3 | 3+ |
| 21 | UNACCEPTABLE | 3 | 4+ | 0+ |
| 22 | UNACCEPTABLE | 4 | 0-2 | 2+ |
| 23 | UNACCEPTABLE | 4 | 3+ | 0+ |
| 24 | UNACCEPTABLE | 5 | 0-1 | 2+ |
| 25 | UNACCEPTABLE | 5 | 2+ | 0+ |
| 26 | UNACCEPTABLE | 6 | 0 | 1+ |
| 27 | UNACCEPTABLE | 6 | 1+ | 0+ |
| 28 | UNACCEPTABLE | 7+ | 0+ | 0+ |

Fig. 15

| PROFILE | HOUSEHOLD CLAIMS RECORD | HOUSEHOLD DRIVING RECORD | STABILITY | MEMBER RELATIONSHIP | ANY/ALL | OPERATOR CLAIMS RECORD | ANY/ALL | OPERATOR DRIVING RECORD | OUTCOME | TIER |
|---|---|---|---|---|---|---|---|---|---|---|
| 1001 | CLEAN | CLEAN | EXC-GOOD | N/A | N/A | N/A | N/A | N/A | PREFERRED | 2A |
| 1002 | CLEAN | GOOD | EXC-GOOD | N/A | N/A | N/A | ALL | CLEAN, GOOD | PREFERRED | 2A |
| 1003 | GOOD | CLEAN | EXC-GOOD | N/A | ALL | CLEAN, GOOD, FAIR | N/A | N/A | PREFERRED | 2A |
| 1004 | GOOD | GOOD | EXC-GOOD | N/A | ALL | CLEAN, GOOD | ALL | CLEAN, GOOD | PREFERRED | 2A |
| 1063 | FAIR | CLEAN | EXC-GOOD | EXCELLENT | ALL | CLEAN, GOOD, FAIR | ALL | N/A | PREFERRED | 2A |
| 1005 | CLEAN | CLEAN | AVG-FAIR | N/A | N/A | N/A | N/A | N/A | STANDARD | 3A |
| 1006 | CLEAN | CLEAN | ACCEPTABLE | EXCELLENT | N/A | N/A | N/A | N/A | STANDARD | 3A |
| 1007 | CLEAN | GOOD | AVERAGE | N/A | N/A | N/A | ALL | CLEAN, GOOD | STANDARD | 3A |
| 1008 | CLEAN | MARGINAL | EXC-GOOD | N/A | N/A | N/A | ALL | CLEAN, GOOD | STANDARD | 3A |
| 1009 | GOOD | CLEAN-GOOD | AVERAGE | N/A | ALL | CLEAN, GOOD, FAIR | ALL | CLEAN, GOOD | STANDARD | 3A |
| 1010 | GOOD | MARGINAL | EXC-GOOD | N/A | ALL | CLEAN, GOOD, FAIR | ALL | CLEAN, GOOD | STANDARD | 3A |
| 1065 | GOOD | GOOD | EXC-GOOD | N/A | ANY | FAIR | ALL | CLEAN, GOOD | STANDARD | 3A |
| 1011 | FAIR | GOOD | EXC-GOOD | GOOD-AVERAGE | ALL | CLEAN, GOOD, FAIR | ALL | CLEAN, GOOD | STANDARD | 3A |
| 1064 | FAIR | CLEAN | EXC-GOOD | N/A | ALL | CLEAN, GOOD, FAIR | ALL | N/A | STANDARD | 3A |
| 1012 | FAIR | MARGINAL | EXCELLENT | N/A | ALL | CLEAN, GOOD, FAIR | ALL | CLEAN, GOOD | STANDARD | 3A |
| 1013 | MARGINAL | CLEAN | EXC-GOOD | N/A | ALL | CLEAN, GOOD, FAIR | N/A | N/A | STANDARD | 3A |
| 1014 | MARGINAL | GOOD | EXCELLENT | N/A | ALL | CLEAN, GOOD, FAIR | ALL | CLEAN, GOOD | STANDARD | 3A |

US 8,170,892 B1

SYSTEM AND METHOD FOR ESTABLISHING RATES FOR AN AUTOMOBILE INSURANCE POLICY

This application claims priority to U.S. Application Ser. No. 60/387,623 filed Jun. 11, 2002, entitled AUTOMOBILE UNDERWRITING ENGINE, which is incorporated herein by reference in its entirety.

BACKGROUND

The disclosures herein relate generally to establishing insurance rates for customers of a company, and more particularly to a system and method for establishing rates for a vehicle insurance policy.

Establishing criteria for setting insurance rates is very complex and requires the consideration of a number of factors. Various combinations of factors have been considered in the past. It is important that the factors used are able to produce reliable results and consistent results. With respect to vehicle insurance, a vehicle includes any device or structure for transporting persons or things, and may include self-propelled vehicles such as, for example, an automobile, a truck, a motorcycle or a boat.

Therefore, what is needed is a combination of factors that are consistently reliable in establishing fair rates for vehicle insurance for both new and renewal coverage, and more particularly, automobile insurance.

SUMMARY

One embodiment, accordingly, provides for establishing rates for a vehicle insurance policy. To this end, calculations are performed for establishing a single tier placement dependent upon a combination of mutually exclusive risk factors based on applicant data. The factors include determining a household driving record gradient, determining a stability gradient, and determining an operator driving record gradient.

Advantageously, no single factor is the sole determinant for placement in a tier because a unique combination of the factors determine tier placement.

BRIEF DESCRIPTION OF THE DRAWINGS

FIG. 1 is a chart illustrating an embodiment of factors considered for a new policy tier placement.

FIG. 2 is a chart illustrating an embodiment of factors considered for a renewal policy tier placement.

FIG. 3 is a chart view illustrating an embodiment of gradients and characteristics for a household driving record factor.

FIG. 4 is a chart view illustrating an embodiment of gradients and characteristics for a named insured driving experience factor.

FIG. 5 is a chart view illustrating an embodiment of gradients and characteristics for a stability factor.

FIG. 6 is a chart view illustrating an embodiment of gradients and characteristics for a prior insurance factor.

FIG. 7 is a chart view illustrating an embodiment of gradients and characteristics for an operator driving record factor.

FIG. 8 is a chart view illustrating an embodiment of a profile comprised of various factors and a resultant tier placement for new coverage.

FIG. 9 is a chart view illustrating an embodiment of gradients and characteristics for a household claims record factor.

FIG. 10 is a chart view illustrating an embodiment of gradients and characteristics for a household driving record factor.

FIG. 11 is a chart view illustrating an embodiment of gradients and characteristics for a stability factor.

FIG. 12 is a chart view illustrating an embodiment of gradients and characteristics for a member relationship factor.

FIG. 13 is a chart view illustrating an embodiment of gradients and characteristics for an operator claims record factor.

FIG. 14 is a chart view illustrating an embodiment of gradients and characteristics for an operator driving record factor.

FIG. 15 is a chart view illustrating an embodiment of a profile comprised of various factors and a resultant tier placement for renewal coverage.

DETAILED DESCRIPTION

Figure 16:
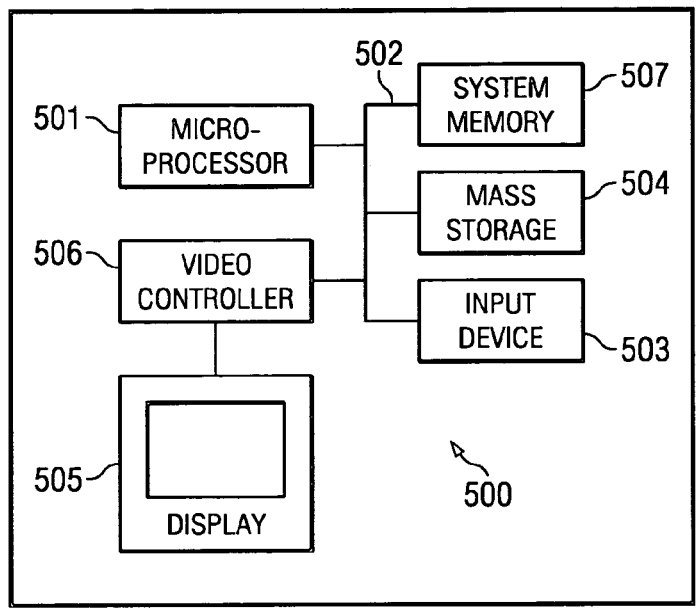
FIG. 16 is a schematic view illustrating an embodiment of a computer system for use in analyzing a member profile and providing a tier placement.

Referring now to FIG. 1, it is illustrated in a chart designated 100, that tier placement considers factors for a new policy including a household driving record factor at 102, a named insured driving experience factor at 104, a stability factor at 106, a prior insurance factor at 108 and an operator driving record at 110.

The household driving record factor at 102 considers the combined driving records for all drivers in the household for example, for the past three years. This includes characteristics such as at-fault accidents and not-at-fault accidents. Major violations are also considered such as, for example, driving under the influence (DUI) and wreckless driving. Minor violations are also considered, such as, for example, moving violations. Other considerations include license status, i.e. active, revoked or suspended. Comprehensive claims are not considered, such as vandalism, etc. As a reference, a not-at-fault accident is where the insured party is less than 50% at fault. Several gradients, in one embodiment, five gradients, are used for the household driving record factor including clean, good, marginal, poor and unacceptable.

The named insured driving experience factor at 104 includes consideration of the characteristics such as the number of years of driving experience. If the named insured has 5 or more years of driving experience, the driver is considered experienced. If the named insured has less than for example 5 years of driving experience, the driver is considered inexperienced. Thus, the gradients may be experienced and inexperienced.

The stability factor at 106 includes characteristics such as a credit score which can be obtained from a credit reporting agency, and which is only used for example, for the first 2 years of coverage. Also included is whether there is one vehicle to be insured, or more than one vehicle to be insured. A further inquiry is made into whether there is a past history of cancellation of insurance for non-payment of an insurance premium. Last, in the case of military personnel, there is a consideration of whether the insured is an officer, a non-commissioned officer (NCO), an enlisted non-NCO, or an ex-dependent, i.e., a spouse or children of a former insured party. The gradients for the stability factor may be excellent, good, average, fair and acceptable.

The prior insurance factor at 108 looks at characteristics such as the type of prior insurance and whether the insured party was previously considered to be an assigned risk or not an assigned risk, and in addition, the number of days since the prior insurance lapsed. The gradients for the prior insurance factor may be good, marginal and poor.

The operator driving record factor at 110 is the same as the household driving record at 102 with the exception that the operator driving record factor considers only the driving record of the operator and not of the combined household. There are for example, four gradients for the operator driving record factor which may include good, marginal, poor and unacceptable.

Referring to FIG. 2, it is illustrated in a chart designated 200, that tier placement considers factors for a renewal policy including a household claims record factor at 202, a household driving record factor at 204, a stability factor at 206, a member relationship factor at 208, an operator claims record factor at 210 and an operator driving record factor at 212.

For a renewal policy, the household claims record factor at 202 includes characteristics such as any at-fault accidents or any not-at-fault accidents, for example, in the past three years, any at-fault accidents in years 4 and 5, and any at-fault accidents, for example, where nothing was paid out by the insurance carrier on behalf of the insured party. Also, comprehensive claims are considered. The combined claims record for all drivers in the household are considered. There may be six gradients used to determine the household claims record which may include clean, good, fair, marginal, poor and unacceptable.

In addition, for a renewal policy, the household driving record factor at 204 is considered and includes characteristics such as major violations, for example, DUI and wreckless driving, and also includes minor violations such as, for example, moving violations. The household driving record includes the combined driving records for all drivers in the household, for example, for the past three years. There may be six gradients used to determine the household driving record factor which may include clean, good, marginal, poor and unacceptable.

The stability factor at 206 includes the same criteria as required for the stability factor at 106, described above, and has the same gradients.

The member relationship factor at 208 includes characteristics such as a consideration of the number of years of past membership, and whether or not the member has collateral coverage such as homeowners or rental insurance. There may be three gradients for the member relationship factor which may include excellent, good and average.

The operator claims record factor at 210 includes the same criteria as required for the household claims record at 202, with the exception that only the claims record for the operator is considered and not the combined household. There may be six gradients for the operator claims record which may include clean, good, fair, marginal, poor and unacceptable.

The operator driving record factor at 212 is the same as the operator driving record at 110, with the exception that there may be five gradients which may include clean, good, marginal, poor and unacceptable.

A risk may be acceptable in one of, for example, four tiers. The tiers are designated as 2A, 3A, 3B and 4A, and are discussed in detail below. The tier 2A is considered the lowest risk and those who qualify are offered preferred insurance rates. The tiers 3A and 3B are considered a higher risk than 2A and those who qualify are offered standard insurance rates. The tier 4A is considered a higher risk than 3A, 3B and tier 4A qualifiers are offered non-standard insurance rates.

Placement in a tier depends on a unique combination of risk factors. Each risk factor depends on a risk gradient, and each gradient depends on a unique combination of risk characteristics.

When establishing a tier for a new policy, the household driving record factor 102, FIG. 3, is considered to determine a gradient of clean, good, marginal, poor or unacceptable. For example, a household driving record for a single vehicle household qualifies for a gradient of good, at 102*a*, where the applicant has the combination of characteristics including no major or minor violations, no at-fault and one not-at-fault accident, and an active license.

The named insured driving experience factor 104, FIG. 4, is considered to determine a gradient of experienced or inexperienced. For example, a driver qualifies for a gradient of experienced at 104*a*, where the named insured has the characteristic of more than, for example, 5 years (60 months) of driving experience.

The stability factor 106, FIG. 5, is considered to determine a gradient of, for example, excellent, good, average, fair or acceptable. For example, the stability factor qualifies for a gradient of fair at 106*a* where the applicant has the combination of characteristics including a range 2 credit score, no prior cancellations for non-payment of an insurance premium, and is an enlisted military person having a single vehicle.

The prior insurance factor 108, FIG. 6, is considered to determine a gradient of, for example, good, marginal or poor. For example, the prior insurance factor qualifies for a gradient of poor at 108*a*, where the applicant has the combination of characteristics including a prior assigned risk with an insignificant number of days lapsed since the prior insurance coverage.

The operator driving record factor 110, FIG. 7, is considered to determine a gradient of, for example, good, marginal, poor or unacceptable. For example, the operator driving record factor qualifies for a gradient of good at 110*a* where the applicant has the combination of characteristics including no major violations, 0-1 minor violations, no at-fault accidents, 0-1 not-at-fault accidents and an active license. Also, operator age may be considered when the operator driving record is marginal. In that case, an older, more experienced driver would have an advantage over a younger, less experienced driver.

Having considered characteristics and established gradients for each factor, a tier of 4A is established on a table at FIG. 8, defined as profile number 1026. The combination of gradients are, for example, good, experienced, fair, poor and good for the respective factors of household driving record, named insured driving experience, stability, prior insurance and operator driving record. Thus, this applicant is qualified for coverage at non-standard insurance rates.

When establishing a tier for a renewal policy, the household claims record factor 202, FIG. 9, is considered to determine a gradient of, for example, clean, good, fair, marginal, poor or unacceptable. For example, a household claims record for a single vehicle household qualifies for a gradient of fair, at 202*a*, where the policy holder has the combination of characteristics of one at-fault accident, for example, in the past three years, one other loss such as a comprehensive claim in the past three years, and no at-fault accidents in, for example, years 4 and 5.

The household driving record factor 204, FIG. 10, is considered to determine a gradient of clean, good, marginal, poor or unacceptable. For example, a household driving record for a single vehicle household qualifies for a gradient of clean at 204*a*, where the policy holder has the combination of characteristics including no major or minor violations in the past three years. It should be noted that for a renewal policy, accidents are not a consideration.

The stability factor 206, FIG. 11, is considered to determine a gradient of, for example, excellent, good, average, fair and acceptable. For example, the stability factor qualifies for a gradient of good at 206*a* where the policy holder has the combination of characteristics including past coverage with the present carrier for 0-18 months, for example, a range 1 credit score, no prior cancellations for non-payment of an insurance premium, and is an enlisted military person. The number of vehicles is not considered.

The member relationship factor 208, FIG. 12, is considered to determine a gradient of, for example, excellent, good or average. For example, the member relationship factor qualifies for a gradient of excellent at 208*a* where the policy holder has the combination of characteristics including, for example, 6-19 years of past membership and collateral coverage such as a homeowner policy with the current provider.

The operator claims record factor 210, FIG. 13, is considered to determine a gradient of for example, clean, good, fair, marginal, poor or unacceptable. For example, the operator claims record factor qualifies for a gradient of fair at 210*a* where the policy holder has the combination of characteristics including, for example, one at-fault accident in the past three years, one other loss in the past three years, such as a comprehensive claim, and no at-fault accidents in, for example, years 4 and 5.

The operator driving record factor 212, FIG. 14, is considered to determine a gradient of, for example, clean, good, marginal, poor or unacceptable. However, this gradient may not be applicable where, for example, the household driving record factor is clean, therefore, all operators for the household are clean.

Having considered characteristics and established gradients for each factor, a tier of 2A is established on a table at FIG. 15, defined as profile number 1063. The combination of gradients are, for example, fair, clean, good, excellent, fair and n/a (clean) for the respective factors of household claims record, household driving record, stability, member, relationship, operator claims record and operator driving record. Thus, this applicant is qualified for coverage at preferred insurance rates. The number of vehicles in a household can be a factor affecting tier placement. For example, two accidents in a three vehicle household can result in a higher tier placement than two accidents in a one vehicle household. This is because there are fewer accidents per exposure in the three vehicle household.

In one embodiment, a computer system 500, FIG. 16, may be used to establish a tier placement on a table based on a member profile. The computer system 500 includes a microprocessor 501, which is connected to a bus 502. Bus 502 serves as a connection between microprocessor 501 and other components of computer system 500. An input device 503 is coupled to microprocessor 501 to provide input to microprocessor 501. Examples of input devices include keyboards, touchscreens, and pointing devices such as mouses, trackballs and trackpads. Programs and data are stored on a mass storage device 504, which is coupled to microprocessor 501. Mass storage devices include such devices as hard disks, optical disks, magneto-optical drives, floppy drives and the like. Computer system 500 further includes a display 505, which is coupled to microprocessor 501 by a video controller 506. A system memory 507 is coupled to microprocessor 501 to provide the microprocessor with fast storage to facilitate execution of computer programs by microprocessor 501. It should be understood that other busses and intermediate circuits can be deployed between the components described above and microprocessor 501 to facilitate interconnection between the components and the microprocessor.

Figure 17:
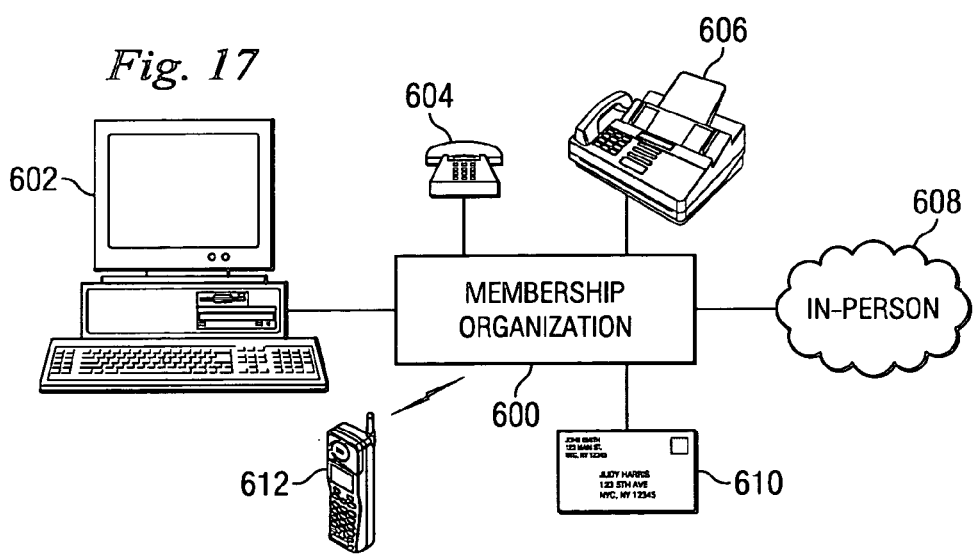
FIG. 17 is a schematic view illustrating various modes of communication with a membership organization for insurance coverage.

Such insurance coverage, discussed above, may be offered by a membership organization 600, FIG. 17, for the benefit of members. A member may access the organization for rates by several modes of communication including, but not limited to, Internet or Intranet 602, phone 604, fax 606, in-person 608, mail 610 or wireless 612.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method comprising:
   performing by a computer processor calculations for determining a single tier placement of a vehicle insurance policy issued by a membership organization, the single tier placement dependent upon a combination of factors based on applicant data for the vehicle insurance policy, the factors including:
   (a) determining a household driving record gradient associated with the applicant;
   (b) determining a stability gradient of the applicant;
   (c) determining an operator driving record gradient of the applicant; and
   (d) determining a membership relationship gradient of the applicant as a function of a combination of:
      a length of time the applicant has had a relationship with the membership organization issuing the vehicle insurance policy; and
      whether the applicant currently has at least one of a homeowners, condo, or renters policy with the membership organization.

2. The method as defined in claim 1 wherein the policy is a renewal policy.

3. The method as defined in claim 1 wherein a plurality of gradients are considered to define each factor.

4. The method as defined in claim 3 wherein a plurality of characteristics are considered to define each gradient.

5. The method as defined in claim 1 wherein no single risk factor is the sole determinant for placement in a tier.

6. The method as defined in claim 1 wherein the factors further include:
   determining a household claims record gradient.

7. The method as defined in claim 1 wherein the factors further include:
   determining an operator claims record gradient.

8. The method as defined in claim 1 wherein the policy is a new policy.

9. The method as defined in claim 1 wherein the factors further include:
   determining a named insured driving experience gradient.

10. The method as defined in claim 1 wherein the factors further include:
    determining a prior insurance gradient.

11. A system comprising:
    a computer system for determining a single tier placement of a vehicle insurance policy issued by a membership organization, the single tier placement dependent upon a combination of factors based on applicant data, the computer system including:
a storage device storing a program; and
a processor coupled to the storage device, the processor operative with the program for establishing the single tier placement in response to determining a household driving record gradient associated with the applicant, a stability gradient of the applicant, an operator driving record gradient of the applicant, and a membership relationship gradient of the applicant, wherein determining the membership relationship gradient is a function of a combination of:
a length of time the applicant has had a relationship with the membership organization issuing the vehicle insurance policy; and
whether the applicant currently has at least one of a homeowners, condo, or renters policy with the membership organization.

12. The system as defined in claim 11 wherein the factors further include:
(a) determining a household claims record gradient; and
(b) determining an operator claims record gradient.

13. The system as defined in claim 11 wherein the factors further include:
(a) determining a named insured driving experience gradient; and
(b) determining a prior insurance gradient.

14. A method comprising:
communicating a request for automobile insurance;
in response to the request, using a computer system for determining a single tier placement of a vehicle insurance policy issued by a membership organization to a member, the single tier placement dependent upon a combination of factors based on data provided by the applicant, the factors including:
(a) determining a household driving record gradient associated with the member;
(b) determining a stability gradient of the member;
(c) determining an operator driving record gradient of the member; and
(d) determining a membership relationship gradient of the member as a function of a combination of:
a length of time the applicant has had a relationship with the membership organization issuing the vehicle insurance policy; and
whether the member currently has at least one of a homeowners, condo, or renters policy with the membership organization.

15. The method as defined in claim 14 wherein the policy is a renewal policy.

16. The method as defined in claim 14 wherein a plurality of gradients are considered to define each factor.

17. The method as defined in claim 16 wherein a plurality of characteristics are considered to define each gradient.

18. The method as defined in claim 14 wherein no single risk factor is the sole determinant for placement in a tier.

19. The method as defined in claim 14 wherein the factors further include:
(a) determining a household claims record gradient; and
(b) determining an operator claims record gradient.

20. The method as defined in claim 14 wherein the policy is a new policy.

21. The method as defined in claim 20 wherein the factors further include:
(a) determining a named insured driving experience gradient; and
(b) determining a prior insurance gradient.

22. A method comprising:
performing by a computer processor calculations for determining a single tier placement of a vehicle renewal insurance policy issued by a membership organization, the single tier placement dependent upon a combination of factors based on applicant data, the factors including:
(a) determining a household driving record gradient associated with the applicant;
(b) determining a member relationship gradient of the applicant as a function of a combination of:
a length of time the applicant has had a relationship with the membership organization issuing the vehicle renewal insurance policy; and
whether the applicant currently has at least one of a homeowners, condo, or renters policy with the membership organization;
(c) determining an operator driving record gradient of the applicant; and
(d) determining a stability gradient of the driver, the stability gradient being characterized by a career position of the applicant; and
using a computer processor to transform data in a memory to indicate the single tier placement for the vehicle renewal insurance policy.

23. The method as defined in claim 22 wherein the factors further include:
determining a household claims record gradient.

24. The method as defined in claim 22 wherein determining a stability gradient comprises determining a military career position of the applicant.

25. The method as defined in claim 22 wherein the factors further include:
determining an operator claims record gradient.

26. A system comprising:
a computer system for determining a single tier placement of a vehicle insurance policy issued by a membership organization, the single tier placement dependent upon a combination of mutually exclusive factors based on applicant data; and
means for performing calculations for establishing a single tier placement dependent upon a combination of factors based on applicant data, the factors including:
(a) determining a household driving record gradient associated with the applicant;
(b) determining a stability gradient of the applicant;
(c) determining an operator driving record gradient of the applicant; and
(d) determining a membership relationship gradient of the applicant as a function of a combination of:
a length of time the applicant has had a relationship with the membership organization issuing the vehicle insurance policy; and
whether the applicant currently has at least one of a homeowners, condo, or renters policy with the membership organization.

27. The method as defined in claim 24 wherein determining a military career position of the driver comprising determining the military career position to be one of officer, non-commissioned officer (NCO), or enlisted non-NCO.

* * * * *